(12) United States Patent
Kolarov et al.

(10) Patent No.: US 10,593,295 B2
(45) Date of Patent: *Mar. 17, 2020

(54) ALIGNED VIDEO COMPARISON TOOL

(71) Applicant: Apple Inc., Cupertino, CA (US)

(72) Inventors: Krasimir D. Kolarov, Menlo Park, CA (US); Steven E. Saunders, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 14/673,824

(22) Filed: Mar. 30, 2015

(65) Prior Publication Data

US 2015/0279330 A1    Oct. 1, 2015

Related U.S. Application Data

(63) Continuation of application No. 13/780,686, filed on Feb. 28, 2013, now Pat. No. 8,994,828.

(51) Int. Cl.
| | |
|---|---|
| *H04N 17/00* | (2006.01) |
| *H04N 19/154* | (2014.01) |
| *G09G 5/14* | (2006.01) |
| *H04N 5/265* | (2006.01) |
| *G06F 3/0484* | (2013.01) |

(52) U.S. Cl.
CPC ........... *G09G 5/14* (2013.01); *G06F 3/04845* (2013.01); *H04N 5/265* (2013.01); *H04N 17/00* (2013.01); *H04N 17/004* (2013.01); *H04N 19/154* (2014.11); *G06F 2203/04803* (2013.01)

(58) Field of Classification Search
CPC ....................................................... G09G 5/14

USPC ........................................... 384/184; 348/184
See application file for complete search history.

(56) References Cited

U.S. PATENT DOCUMENTS

| | | | |
|---|---|---|---|
| 4,404,590 A | 9/1983 | Mayer et al. | |
| 5,617,114 A | 4/1997 | Bier et al. | |
| 6,269,482 B1 * | 7/2001 | Gershfeld | H04N 17/00 348/180 |
| 6,400,401 B1 * | 6/2002 | Morino | H04N 5/232 348/143 |
| 7,071,934 B1 | 7/2006 | Faoro et al. | |
| 7,683,931 B2 | 3/2010 | Pirzada et al. | |
| 8,370,823 B2 | 2/2013 | Bashkansky et al. | |
| 8,620,146 B1 * | 12/2013 | Coleman | H04N 5/765 386/223 |

(Continued)

FOREIGN PATENT DOCUMENTS

WO    2013022486    2/2013

OTHER PUBLICATIONS

U.S. Appl. No. 13/780,686, filed Feb. 28, 2013, Krasimir D. Kolarov et al.

(Continued)

*Primary Examiner* — Jefferey F Harold
*Assistant Examiner* — Justin Sanders
(74) *Attorney, Agent, or Firm* — Robert C. Kowery; Kowert, Hood, Munyon, Rankin & Goetzel, P.C.

(57) ABSTRACT

A video quality comparison tool provides for direct visual perceptual comparison of video sequences. Two inputs are presented at the same position and size, with no-look user choice of which to see and easy back-and-forth comparison while the videos are playing, single-stepping, or paused.

20 Claims, 9 Drawing Sheets

(56) References Cited

U.S. PATENT DOCUMENTS

| | | | | |
|---|---|---|---|---|
| 8,675,021 | B2* | 3/2014 | Reusens | G06T 15/50 |
| | | | | 345/639 |
| 2004/0201780 | A1* | 10/2004 | Kim | H04N 5/45 |
| | | | | 348/565 |
| 2005/0019015 | A1* | 1/2005 | Ackley | G11B 27/10 |
| | | | | 386/201 |
| 2007/0240072 | A1* | 10/2007 | Cunningham | G06F 3/04817 |
| | | | | 715/764 |
| 2009/0087046 | A1 | 4/2009 | Kuhn | |
| 2009/0316795 | A1* | 12/2009 | Chui | H04N 7/163 |
| | | | | 375/240.25 |
| 2010/0157144 | A1* | 6/2010 | Okamoto | H04N 17/04 |
| | | | | 348/441 |
| 2013/0124999 | A1* | 5/2013 | Agnoli | G11B 27/031 |
| | | | | 715/723 |
| 2014/0063229 | A1* | 3/2014 | Olsson | H04N 5/2252 |
| | | | | 348/84 |

OTHER PUBLICATIONS

Bier, E. A., Stone, M., Pier, K., Buxton, W. & DeRose. T. (1993). Toolglass and magic lenses: the see-through interface. ACM, Proceedings of SIGGRAPH '93, pp. 73-80.

* cited by examiner

ALIGNED VIDEO COMPARISON TOOL

This application is a continuation of U.S. patent application Ser. No. 13/780,686 filed Feb. 28, 2013, now U.S. Pat. No. 8,994,828, which is hereby incorporated by reference herein in its entirety.

BACKGROUND

Technical Field

This disclosure relates generally to video quality evaluation, and, more specifically, to comparing and evaluating video sequences through direct perceptual comparison.

Description of the Related Art

Video quality comparison may be performed to ascertain the quality of video imagery by comparing multiple versions of video imagery. For example, video may be evaluated to ascertain differences between a first version of a video and a second version of the same video. For instance, a first version of a video may be encoded or compressed into a second version of the video in such a way as to reduce the amount of memory space necessary to store the video. Such coding may also reduce the amount of bandwidth necessary to transmit the video in a certain amount of time as well as reduce the amount of processing power required to display the video images. Some coding schemes used to compress the video are imperfect and result in perceptible imperfections when the encoded video is decoded and displayed. Video quality comparison may identify such deficiencies. There are multiple ways to evaluate video quality. For example, comparison may be performed by measuring quantitative differences between the encoded and non-coded video data or by discerning qualitative differences through direct visual perception of the displayed video.

Qualitative video comparison may be performed by visual comparison of two versions of a video. For example, a first video may be viewed; then a second video may be viewed subsequently to the first, and visual differences noted. Differences such as visual imperfections (e.g., artifacts, glitches, discoloration) that are apparent in one version but not the other version may be noted. It may be difficult for the person viewing the first and second video to remember characteristics of the first video while viewing the second video. Sometimes the first and second videos are displayed in respective first and second video player windows at once in order to reduce reliance upon the memory of the person viewing the videos. For example, it is known in the art to drag and stretch videos playing in two different players so that they overlap or become somewhat aligned on the screen. This is a delicate, laborious process, and must be done by hand every time a new video is opened for comparison or when a previous video is re-opened. Switching between these manually aligned windows relies on switching operations provided by a general-purpose operating system that interrupt direct visual comparison because they require attention to a menu, or impose a menu or other selection imagery in between comparison images of the videos. Additionally, the multiple controls of the multiple players may hinder synchronous play of the videos, thus nullifying much of the perceived benefit of multiple-window video comparison.

SUMMARY OF EMBODIMENTS

Embodiments of the present disclosure enable a computing device to implement a video quality comparison application or a video quality comparison tool for evaluating the quality of video by displaying a first image of a first version of a video and then alternatively displaying a second image of a second version of the video within the same player window where the first image was displayed. While only one video may be visible at any one time, they are both playing in alignment and frame-exact sync (or close to frame-exact sync if their frame rates do not match). Such an alternating or blinking between the first and second versions of a video may be referred to as flicking.

In some embodiments, the first and second versions of the video may be played in spatial and temporal alignment within the same window. For example, spatial-alignment may be achieved by adjusting one or both versions of the video to achieve pixel registration among the two versions. For example, the video tool may instruct two video players to adjust their output such that spatial alignment is achieved. Spatial alignment may involve scaling, cropping and/or adjustment of the aspect ratio. In another example, time alignment may be achieved while playing one version of the video and then switching from the one version of the video to the other version of the video without skipping any frames during the switch. In another example, time alignment may be achieved by providing a continuous, uninterrupted display of the video during the switch from one version to another version.

Various embodiments provide no-look user control of the flicking between video versions. For instance, particular movement of the cursor in the display may select the first version or the second version for display within the window. In another instance, a key may be chosen to select either version of the video for display during playing of the videos. Similarly, keys may be selected to control a stepping feature where the video player steps frame by frame. For example, the right arrow key may step forward while the left arrow key steps in reverse.

In some embodiments, the two versions of the video may be played side-by-side or in split-display mode instead of in the alternating mode described above. For example, the videos may be played in time alignment and in comparative spatial alignment together in the same window with a seamless or invisible boundary between the two video versions. In another example, one of the versions is played as a mirror image to the other version.

In some embodiments, the two versions of the video may be played in a loupe mode. For example, a portion of a first video may be played inside a circular area within the window while the second video is played in the rest of the area outside circular area. The small circular area may be selectable and movable within the window to display other areas of the first video within the surrounding display of the second video.

Figure 1:
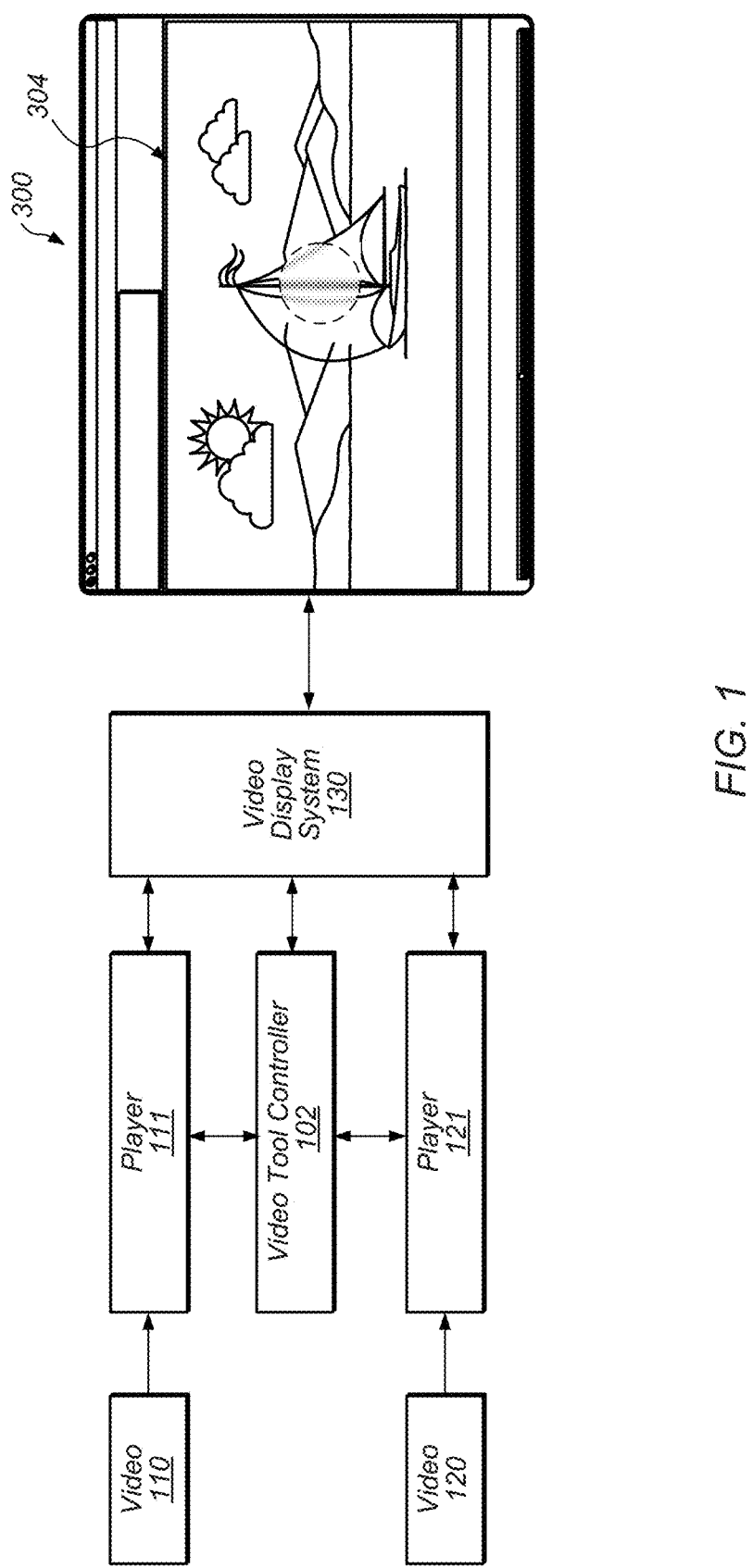
FIG. 1 illustrates a video quality evaluation system in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Various embodiments of a system and method for evaluating video (e.g., comparing versions of a video) for video quality are described herein. In some embodiments, the comparison tools, and/or applications described herein may be implemented as part of various devices, including but not limited to, tablet computing devices, mobile phones, personal video recording devices, or any other device that also has video playing functionality. A user of such devices may interact with a video player application or tool capable of presenting multiple versions of a video so the user can directly perceive and compare the videos. In some embodiments, only one video is visible at a time, but both are playing in frame-exact sync (or close to it if their frame rates do not match) in the background. The usual play, pause, fast-forward, and reverse controls may be available. Slow play and single step controls may also be available and the view may be moved and resized.

Video files are generally large files that can benefit from coding techniques that reduce the file size. Various coding techniques are known that can compress high quality video images into a file with fewer bits than the high quality file while retaining most of the qualities of the video images when displayed. Various coding techniques have various characteristics that make them suitable for one type of video over another. Some coding techniques are better at capturing movement while some coding techniques are better at capturing sharp details. Compression is generally of two types. Lossless compression identifies and eliminates statistical redundancy while lossy compression identifies and removes marginally important information.

Compression generally includes encoding a source file to create a compressed file. In some instances, the source file itself is an encoded version of another file. In either case, it may be useful to compare the quality of the displayed output of the files. For example, the source file and the encoded file may be compared to identify visually-perceptible differences between the source file and the encoded file. In one example, a visually-perceptible difference between the files may be used to determine if the quality of the encoded file is acceptable for publishing. In another example, the differences may be used to assess the coding scheme. A different coding scheme may be chosen if the results are unacceptable or additional processing may be performed.

Visual comparison of video may be facilitated by aligned comparison. It is known that comparing two images for differences is difficult, especially when the differences are unknown and especially when the images are of video in motion. For example, it is particularly difficult to keep enough image detail in short-term memory while moving the gaze and attention between two spatially separated images, or while waiting between two temporally separated images. Adding to the difficulty is effective blindness during a saccade and the relationship between saccades and targets. A saccade is a (involuntary) rapid movement of the eye from one relatively stable point of gaze or fixation, to another. The brain monitors the eyes drift away from the target, in order to return the gaze to the target. Various embodiments disclosed herein reduce the spatial and temporal separation between the images and address the difficulties associated with saccades.

Various embodiments described herein rely upon aligning two videos such that corresponding pixels are in alignment (pixel registration) when displayed. Such a comparison scheme exploits several properties of human perception. One advantage is the perceptual salience (or "pop-out") property of changes with a generally unchanging field. With pixel alignment, differences between frames are the only changes. Salience is not diluted by position or timing changes (outside) the frames. Another advantage is overcoming the difficulty of keeping enough image detail in short-term memory while moving the gaze and attention between two spatially separated images, or while waiting between two temporally separated images. Various of the disclosed embodiments overcome such difficulties.

In various embodiments, a video tool may play a first video and a second video within the same window, such that the video tool alternates between presentations of the two videos in the same video tool player window. In one example, the first video is a source video and the second video is an encoded version of the source video For example, the video tool may receive instructions from a user to select a first video and a second video for comparison. The video tool may analyze the format, the aspect ratio, and/or the cropping to determine adjustments to make to either one or both of the videos to cause the first video and the second video to become aligned when superimposed. Adjustments may include alignment through scaling, changing the window aspect ratio, and/or stretching. Other adjustments may include cropping to make both videos the same size. Other adjustments are contemplated as well, for example, timing adjustments, without departing from the scope of the invention. In some embodiments, the video tool may instruct one or more video players to display the first video, in accordance with the adjustments, in the video tool player window. Upon receiving an instruction from a user through the user interface of the video tool, the video tool player may instruct the video players to switch to playing the second video, in accordance with the adjustments, in the same window where the first video was displayed. In one example, a user may select, through the user interface, to have the video tool automatically alternate between the first video and the second video at some periodic rate (e.g., switch between videos at about ½ to 1 Hz). In another example, the video tool may provide selectable functionality for stepping slowly (e.g., 1-10 times per second), frame by frame, while alternating between frames of the first and second videos.

In some embodiments, the video tool accepts input from the user in such a manner that reduces the perceptual load on the user. For example, operating systems and various known applications often provide menu selections (e.g., drop down or otherwise) that require the user to navigate, find, and select various functionality. The navigating and finding associated with such a menu can cause the user to move their attention away from the content being displayed and instead force the user to focus their attention on navigating the menu system to find the desired functionality to select. The video tool disclosed may, in various embodiments, accept user input in such a manner that the user may maintain focus on the video tool player content while making selections. For example, simply moving the mouse cursor to the left half of the video display frame of the window may select display of the first video while moving the mouse cursor to the right half of the video display frame may select display of the second video. In another example, the Up-Arrow key selects the first video while the Down-Arrow key selects the second video.

Navigating a menu for selecting functionality can force a user to move their gaze or concentration from the content of the video player. Various other distractions can also capture the user's attention. For example, switching between two different graphical user interfaces (GUIs) for two different video players requires attention to a menu (e.g., selection from an operating system menu or a flash menu or other selection imagery in between, or both). As such, the switching is not perceptually seamless. Video comparison is improved by switching between the video in a perceptually seamless manner. For example, providing a single set of controls (e.g., a single GUI) to control both videos. In some embodiments, perceptually seamless means without visually-perceptible interference of the video (e.g., the video appears to be displayed continuously, without any visual interruption). In another embodiment, perceptually seamless means without any visual interruptions such as menus that may cover some or all of the displayed video. In other embodiments, perceptually seamless means without intervening visual delay, blanking, fading and/or white frame, etc. In some embodiments, perceptually seamless means without the distraction caused by navigating multiple graphical controls of multiple video player windows. In some embodiments, perceptually seamless means a visually continuous presentation of the videos in the entire video display area while the videos are played.

In some embodiments, video comparison is performed using different functionality of the video tool. For example, in a loupe mode of operation, the video tool may provide a loupe tool. A loupe tool may be manipulated by a user to select a particular area for comparison between the two videos. In one example, the loupe tool is a circular (or other shape) graphical tool that displays a circular area of one video inside the circle while the rest of the video tool player displays the other video outside the circle. In some examples, the loupe is selectable and movable within the display. The user interface, display portion control module, video players and video display system may be coordinately configured to provide such functionality In some embodiments, video comparison is performed with the first and second videos displayed at the same time within the window. For example, in split-display (side-by-side) mode, with one video oriented so the two videos appear to play as mirrored images, other than for their coding differences. In another example, the first and second videos are displayed at the same time, in split-display mode without one of the videos presented as a mirror image of the other.

Video Tool

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a phone or tablet. Exemplary embodiments of such devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer, perhaps with a touch-sensitive surface (e.g., a touch screen display and/or a touch pad).

Attention is now directed toward embodiments of a video tool for evaluating videos. FIG. 1 illustrates a video quality evaluation system in accordance with some embodiments. Video tool controller 102 is sometimes called a "video tool" for convenience, and may also be known as or called a video tool application or video controller.

It should be appreciated that video tool 102 is only one example of a video evaluation tool, and that video tool 102 may have more or fewer components than shown, may combine two or more components, or may have a different configuration or arrangement of the components. The various components shown in FIG. 1 may be implemented in hardware, software, or a combination of hardware and software, including one or more signal processing and/or application specific integrated circuits.

FIG. 1 illustrates an embodiment of video tool controller 102 that directs players 111, 121 to send data representing content from videos 110, 120, respectively, to video display system 130, as described herein. It should be understood any reference to "video tool 102 plays" or "video tool 102 instructs players 111, 121 to play" generally refers to the video tool 102 sending instructions to video players 111, 121. The instructions may instruct video payers 111, 121 to send data corresponding to the respective video to video display system 130. Furthermore, video display system 130 drives video display 300 to actually display the images corresponding to the respective videos 110, 120.

In some embodiments, video tool 102 acts as a stand-alone software application. For example, video tool controller 102 may be implemented as a stand-alone software component that communicates with separate software applications including player components 111, 121 to send, respectively, videos 110, 120 to video display system 130 for display in video display window 300. In other embodiments, video tool controller 102 may incorporate one or both players 111, 121 into one application including the video tool component 102 to send, respectively, videos 110, 120 to video display system 130. For example, video tool controller 102 may include a single player capable of simultaneously decoding videos 110, 120 and directing either, or portions of either videos 110, 120 to video display system 130. In some embodiments, video tool controller 102 may incorporate a user interface 204 to provide a single set of controls for controlling both players 111 and 121. Exemplary methods performed by video controller 102 for displaying the videos 110, 120 through video display system 130 are described herein (FIGS. 4 and 5) and illustrated further in FIGS. 3A-3D.

Furthermore, video players 111, 121 may play videos 110, 120 without the videos being displayed. For example, both video players 111, 121 may be actively playing (accessing and processing video content data associated with a video) through the video player including the video player buffers without any or all of the video content data being sent to video display system 130. In some embodiments, the active playing of the videos 110, 120 by video players 111, 121, in the background, facilitates rapid and unimpeded switching between display of the videos 110, 120 in video display area 304.

In some embodiments, players 111, 121 function as video players. For example, players 111, 121 may provide video-related functions such as decoding, playing, pausing, stepping, stopping, rewinding, and forwarding as well as zooming, full-screen, audio channel selection, subtitle selection, frame capture, etc. Although players 111, 121 may include their own GUIs, the video tool controller 102 will generally provide its own GUI in place of either of the GUIs that may be part of the video player applications 111, 121, while accessing the underlying functionality (e.g., codecs and other video-related functionality) from each player.

Video players 111, 121 may also analyze content and determine adjustments necessary to align videos 110, 120. For example, video tool 102 may provide video player 111 with an instruction to play video 110 within display area 304. In response, video player 111 may analyze the format of video 110, determine the size of the area allocated to display area 304 and then adjust output of video 110 such that video 110 plays within display area 304. Video tool 102 may then provide video player 111 with an instruction to stop playing video 110 within display area 304 and instruct video player 121 to play video 120 within display area 304. Video player 111 may stop playing video 110 in display area 304 in response to the instruction. Also in response to the instruction, video player 121 may analyze the format of video 120, determine the size of the area allocated to display area 304 and then adjust output of video 120 such that video 120 plays within display area 304.

In some embodiments, video players 111, 121 would need to know about the format of the video being played by the other player so that the videos may be adjusted to play in alignment within display area 304. In one exemplary embodiment, video tool 102 analyzes the format of the two videos 110, 120 and determines any scaling, aspect ratio adjustments, cropping, or other adjustments necessary to align videos 110, 120 and sends those adjustments to video players 111, 121 to carry out. In another example, the video tool 102 sends each player 111, 121 the format information for both videos and the players 111, 121 each analyze the format of the two videos and each determine any scaling, aspect ratio adjustments, cropping, or other adjustments necessary to align videos 110, 120. The video players 111, 121 may then each carry out the adjustments they each determined.

Various embodiments may address analysis of temporal alignment in a similar fashion. For example, video tool 102 may analyze the frame rates of videos 110, 120 and determine adjustments necessary for videos 110, 120 to be played in time alignment. Video tool 102 may instruct video players 111, 121 to play videos 110, 120 in accordance with the determined timing adjustments. In another example, video tool 102 may send the frame rates for each of videos 110, 120 to both video players 111, 121 such that the video players 111, 121 determine and carry out the necessary timing adjustments on their own.

In various embodiments, players 111, 121 include codecs that enable compression and/or decompression of digital video. A variety of codec compression schemes may be implemented and it is possible for multiple codecs to be available in the same player. Many digital video codecs use standard compression formats which increases compatibility. Some exemplary formats include: QuickTime, Apple ProRes, or MP4 files using a range of codecs including standard MPEG-2 and MPEG-4 codecs, although other formats and codecs are contemplated without departing from the scope of the invention.

The video tool 102 may ignore or may direct players 111, 121 to ignore, any (additional) video tracks, non-video tracks, data, or audio in the video files. In some embodiments, the players 111, 121 may show only the first video track of a video, but selection of any of the available tracks for analysis may be configurable. For example, some embodiments may include (for analysis or otherwise) the audio tracks. In other examples, only the luma channel or only a chroma channel (e.g., as gray) is displayed.

Video display system 130 may be any of various display systems suitable for devices supporting the video tool 102 such as a graphics processing unit for example. In some embodiments, video display system 130 comprises specialized electronic circuitry for rapid manipulation and altering of memory to accelerate the building of images in a frame buffer intended for output to a display 304. For example, video display system 130 may be implemented as a video card or integrated directly into the CPU or mother board.

Video processing generally relies upon various buffers. For example, video output devices rely upon frame buffers to temporarily store video data and media players may perform their own buffering as well, in buffers that feed the frame buffer, for example. Various embodiments contemplate the use of buffers by any or all of video tool controller 102, players 111, 121 and video display system 130 for temporarily storing data from videos 110, 120. For example, players 111, 121 may both be running videos 110, 120 through their respective buffers at the same time such that when video tool 102 sends instructions to switch between videos, or display different portions of the videos, the contents of the buffer associated with the to-be-displayed content is readily available and can immediately be sent to the frame buffer of video display system 130.

Figure 2:
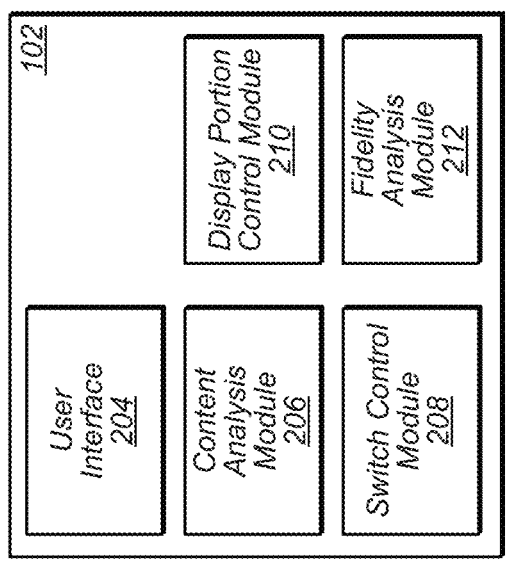
FIG. 2 illustrates a block diagram of components for a video tool controller in accordance with some embodiments.

FIG. 2 illustrates a block diagram of components for a video tool controller 102 in accordance with some embodiments. In FIG. 2, video tool 102 includes user interface 204 for accepting user input and providing feedback to the user, content analysis module 206 for analyzing and determining adjustments for the videos to play in a preferred temporal and spatial form, switch control module 208 for switching between videos, display portion control module 210 for determining, selecting, and directing portions of the videos to display and fidelity analysis module 212 for quantitative analysis of video quality. In some embodiments, the modules 204-212 of video tool 102 perform the methods illustrated in FIGS. 5 and 6 in coordination with the graphical user interface (GUI) illustrated in FIGS. 3A-3D.

In some embodiments, user interface 204 accepts user instructions through selection of textual or graphical components (e.g., menu and/or control buttons) of the display by the user. The user interface 204 may communicate the instruction to any of components 206-212, players 111, 121 or video display system 130 to carry out the instructions as described herein. For example, the selection may be passed from user interface 204 to player 111 to instruct player 111 to use a particular video file as video 110. Similar instructions may be passed to player 121 to instruct player 121 to use another particular video file as video 120. In some embodiments, user interface 204 accepts user instructions through off-screen devices (e.g., keyboard, mouse, button, accelerometer, etc.) without a corresponding displayed control element.

In some embodiments, the various modules may present output to the user or ask for and accept input from the user through user interface 204. User interface 204 may accept instructions from a user such that the user can instruct the video tool to switch between display of the videos 110, 120 without having to look for a menu or button (so called "no-look" user selection). Ideally, such selection of the switching functionality would not cause a user to change user focus from the video display area 304 and would therefore allow the user to maintain focus on the video display area 304. In other words, in some embodiments, the functionality providing or supporting selection does not require input to a user interface element displayed outside the display area 304 (illustrated in FIGS. 3A-3D). As describe above, for example, movement of the cursor within the display area 304 may select video 110 or video 120 for display. For instance, video 110 may be selected when the cursor is on the left side of the video display area 304 and video 120 may be selected when the cursor is on the right side of the video display area 304. In another instance, a keyboard key may be chosen to select either of the videos 110, 120 for display during playing of the video, such as the up-arrow key for selecting the first video and the down-arrow key for selecting the second video or repeated selection of the same key may also act as a switching input. Similarly, keys may be selected to control other functionality, such as a stepping feature where the video player steps frame by frame. For example, the right arrow key may step forward while the left arrow key steps in reverse. Furthermore, other user input for requesting performance of various functionality are contemplated, such as alternative cursor movements, or gestures.

As noted above, video controller 102 may instruct players 111, 121 to present videos 110, 120 in alignment. Alignment may be achieved by any means known now or developed in the future and is not limited to scaling, aspect ratio adjustments, cropping, and stretching as needed to create the alignment. Alignment may be automated and performed either directly by video tool controller 102 or video players 111, 121. For example, content analysis module 206 may analyze the videos to determine if the videos are of different sizes. If a difference is determined, the content analysis module 206 may determine one or more adjustments to either or both of the video players 111, 121 and/or videos 110, 120 so that the videos are the same size. Alignment may also be performed manually by a user through manipulation of various aspects of the user interface 204.

Figure 3A:
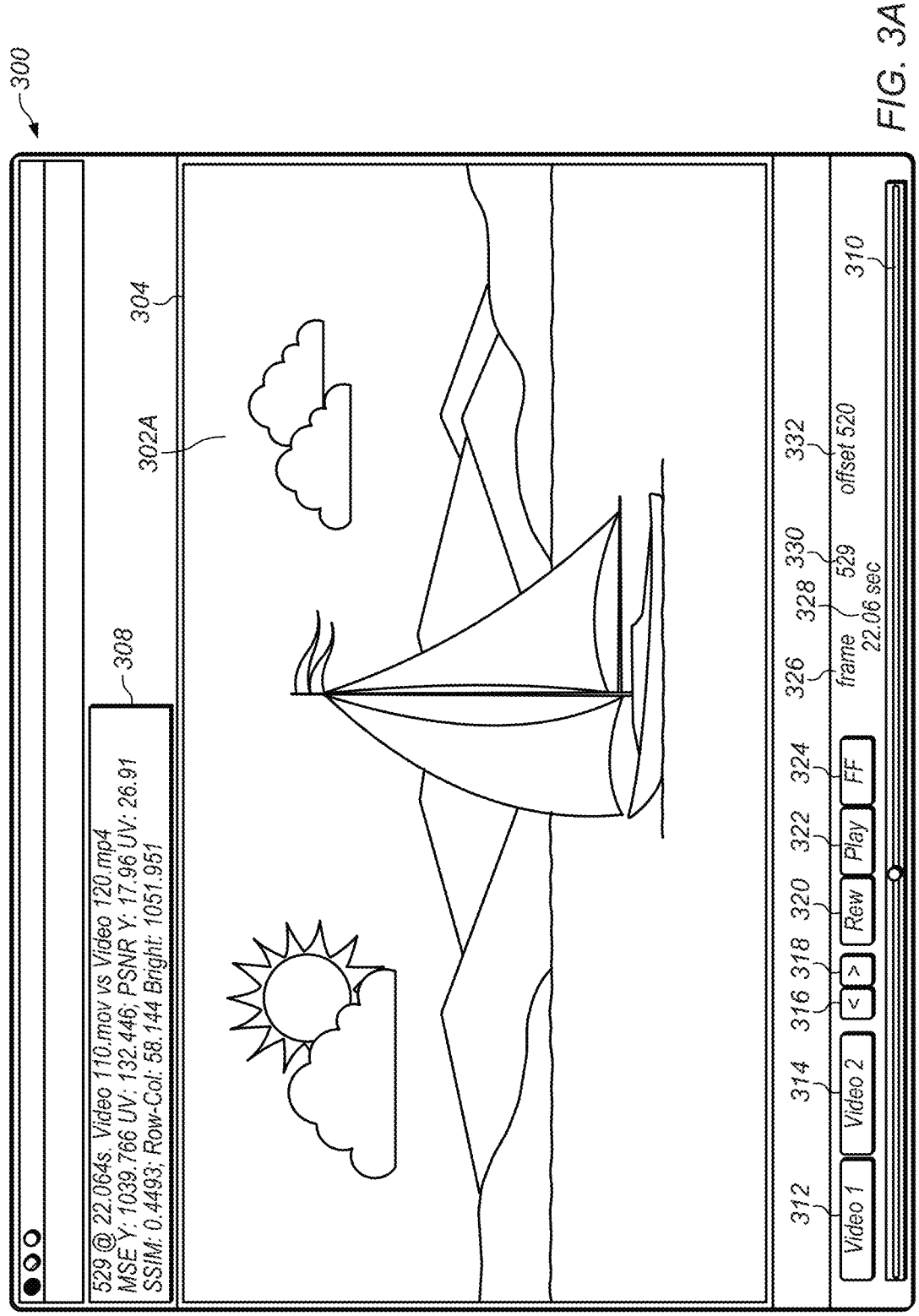
FIGS. 3A-3D illustrate an exemplary video quality tool user interface in accordance with some embodiments.
Figure 3B:
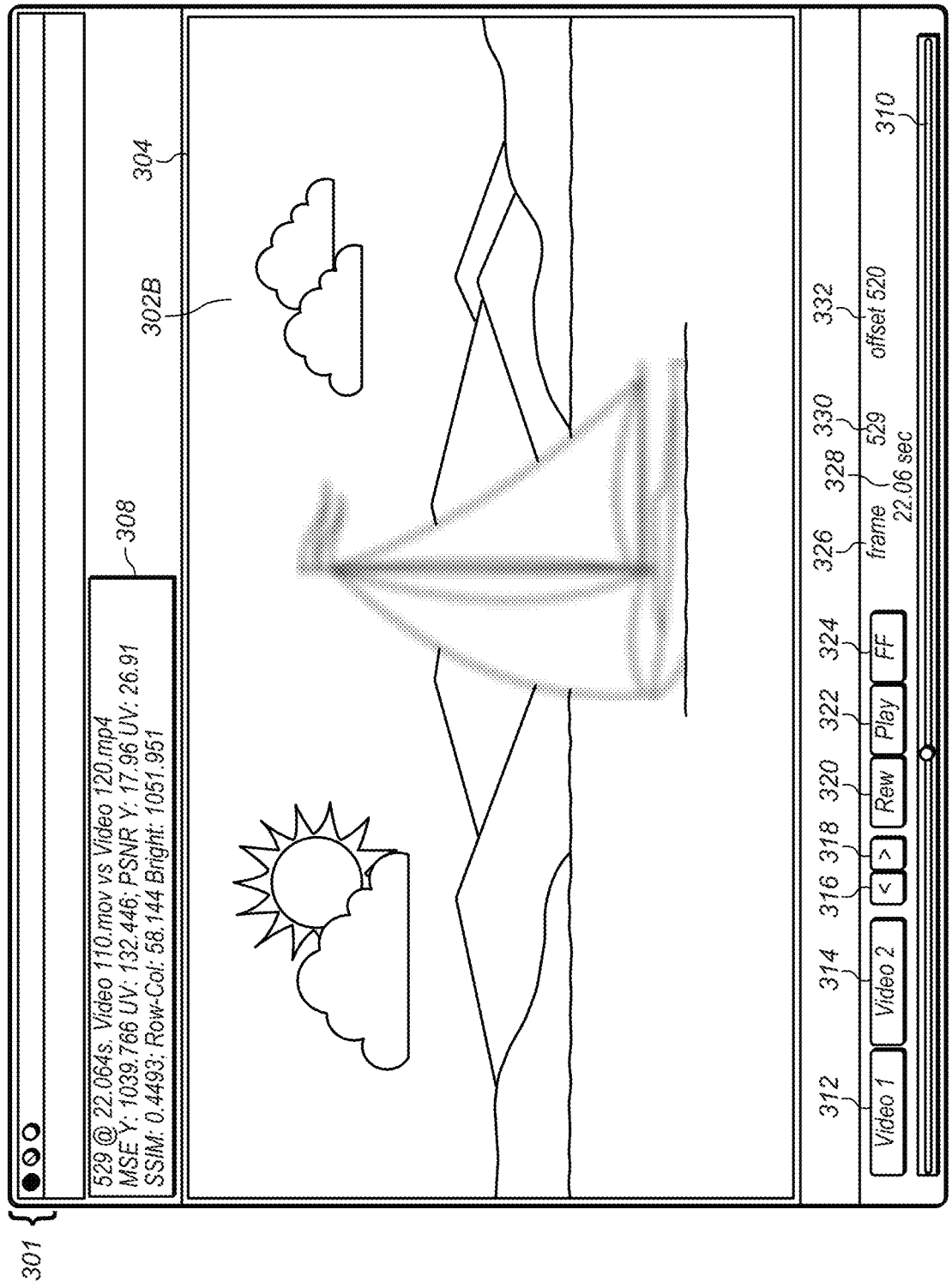

Video controller 102 may include content analysis module 206 which, in some embodiments, may perform the analysis required to determine what adjustments are necessary to achieve the appearance of superimposition of videos 110, 120. In other embodiments, the players 111, 121 may perform the analysis required to determine the adjustments such as scaling, adjusting the aspect ratio, stretching and/or cropping so that the videos 110, 120 can be aligned. Accurate alignment may improve video comparison, especially in the alternating mode, because any difference between placement of the two images 302A, 302B in the display area 304 gives a strong sense of change nearly everywhere in the display area 304. The overall sense of change interferes with the desired perception of a particular change in one area of the display 304. An example of a particular change is illustrated in FIGS. 3A and 3B. In FIG. 3A, the boat in the foreground is illustrated with crisp, clear lines, while in FIG. 3B the boat is depicted with blurred lines. In some embodiments, the blurriness of the boat, in particular, would stand out as the video display area 304 alternated between images 302A, 302B, while the rest of the scene would appear unchanging.

Video controller 102 may support alignment directly by instructing the players 111, 121 on how to adjust the images before instructing the players 111, 121 to send the videos to video display system 130 such that the videos 110, 120 will be displayed, alternatively, and in alignment, within the same display area 304 of video display 300. Video controller 102 may also direct players 111, 121 to adjust for the scaling of the videos 110, 120 when the view display area is resized.

In some embodiments, the user interface 204 may be configured to support manual cropping and stretching of a displayed video to achieve as-close-as-possible, near-perfect, or perfect pixel registration, depending on what is possible given the variety of factors involved. The results of the manual and/or determined adjustments may be stored for re-use with the video or for use with other videos of the same format.

Cropped videos may sometimes be brought into registration by changing the window aspect ratio so that the video sizes are constrained only horizontally, or only vertically.

Content analysis module 206 may determine if alignment of videos 110, 120 requires scaling. For example, to map an HD video to an SD video, videos (e.g., movies) come equipped with clear aperture (also referred to as "clean aperture") specifications, and scaling transformations may use the clear aperture specifications instead of frame dimensions or encoded aperture dimensions. For example, an HD video may be mapped to an SD video, not as 1920× 1080→640×360 (the frame scales), but as 1888× 1062→640×360 (1888×1062 is the clear aperture scale in one interpretation). The clear aperture specification is just one particular example of many factors that may need to be taken into account when determining a scaling factor. Similar complexities may hinder exact registration but many can generally be overcome by the use of anamorphic scaling. Anamorphic scaling is when the height and width of the image are scaled by different percentages. In some embodiments, content analysis module 206 may determine what, if any anamorphic scaling is required to achieve pixel registration while in other embodiments the players 111, 121 may determine and perform the anamorphic scaling before sending the videos 110, 120 to video display system 130. In some embodiments, the viewing size may be locked to that of either video. This may minimize the impact of scaling errors (e.g., when the viewing area is resized).

In some instances, videos 110, 120 may have frame dimensions that may prevent exact registration in the video tool. Content analysis module 206 may support both automated and manual adjustments, such as stretching, that may be needed between two videos that have different aspect ratios, or where the cropping has altered the frame size.

Content analysis module 206 may determine that accurate alignment requires image cropping of either of videos 110, 120. For example, to remove black areas from letterbox content. If this cropping is done after scaling rather than before, the black areas may have some bleed into the active areas due to the scaling filters, so edge rows will be significantly darkened. In some embodiments, the content analysis module 206 may support automated cropping of the edge rows or may crop before scaling.

In some instances, the methods used by content analysis module 206 to achieve alignment and pixel registration may include more than automated scaling, cropping and adjusting the aspect ratios of the frame rectangles to fit. For example, video tool 102 may support a display mode that allows the user to manipulate one video (e.g., stretching or compressing the display window) in order to achieve pixel registration with the other video. In some embodiments, the user may configure the video tool by directly manipulating the display frame itself (e.g., stretching or compressing the display window) to get as close to pixel registration between the two videos as possible. In some embodiments, the user may adjust configuration settings by manipulating a graphic tool or entering numbers (e.g., absolute height or width dimensions or scaling of either individually) into the user interface of the video tool in order to directly manipulate either one of the videos. Content analysis module 206 may save the manual configuration specifications along with the automated configuration so the alignment need not be repeated. In some embodiments, saved configuration files for known comparisons may be used for different videos. For example, a configuration file that was used to compare two version of the same video (e.g., an HD video in 1080 p24 and the SD version of the video with a 4:3 aspect ratio) may be reused to compare two versions of a different video if the two versions of the different video are in the same formats (e.g., an HD video also in 1080 p24 and the SD version of the video also with a 4:3 aspect ratio).

In some embodiments, time correspondence between frames is maintained during the presentation of the videos 110, 120. To the extent that the two videos are not aligned temporally at the start of the video, content analysis module 206 may determine and apply any adjustments necessary for temporal alignment of the videos 110, 120 when displayed. Sometimes the video tool 102 may automatically perform temporal adjustments by instructing video player 111, or 121, or both to make adjustments to achieve the desired temporal relationship. When the videos 110, 120 have the same frame rate, temporal alignment is a relatively simple exercise of matching two corresponding frames. However, when the videos 110, 120 have different frame rates, temporal alignment may be more challenging. In some embodiments, the two displayed videos 110, 120 may move slightly out of sync while still providing valuable functionality. The videos 110, 120 will return to close time alignment each time their frame rates meet at a common denominator. For paused or still frame comparison, frame correspondence may be checked. For example, frames with the closest time stamp may be compared, while in another example, interpolated frames may be created for comparison when the difference between the time stamps of the two frames is greater than some threshold. It is also contemplated that the user interface 204 and content analysis module 206 may be coordinately configured to accept manual adjustments indicating a temporal offset of one video with reference to the other video. For example, by frame number, by time, or by visual search.

In some embodiments, various coding schemes have various frame rates that may have numerically higher common denominators. In an unlikely example, chosen for illustration, two versions of a video are selected, one with a frame rate of 24 p and the other having a frame rate of 60 p. The lowest common frame rate will be 120 p. In this example, the frames of the two videos will be in perfect temporal alignment only once every 5th frame of the 60 fps video and every 2nd frame of the 24 fps video (equivalent of ¹⁄₁₂ second for both).

Such temporal misalignment can be distracting, especially when the videos are being compared using the step button to step back one frame or step forward one frame at a time. In some embodiments, content analysis module 206 instructs one of players 111, 121 to create frames to facilitate comparison. For example, interpolation may be used to create a frame that is in the same temporal space as the frame it is being compared to. In another embodiment, the video tool 102 may instruct one of the players 111, 121 to step forward or backward while holding the other video at the same frame. Such an embodiment may support exercise of the user's judgment during video analysis.

As noted above, direct perceptual comparison of video sequences suffers from many difficulties. One such difficulty is "change blindness" when changed images are separated by blank or otherwise distracting images. FIGS. 3A and 3B illustrate the user interface in a mode where the display 304 alternates, or switches between displaying image 302A and 302B of videos 110, 120, respectively. In some embodiments, switch control module 208 receives instructions from user interface 204 to switch from displaying video 110 to video 120. In the disclosed embodiments, video display system 130 may cut seamlessly between the two videos 110, 120 without intervening delay, blanking, fading, white frame, or any other visually perceptible interruption. In some embodiments, switch control module 208 receives instructions from user interface 204 to switch to a display mode that automatically switches between displaying videos 110, 120 on video display system 130 and then carries out the instructions by instructing players 111, 121 to alternately switch between videos 110, 120 at a constant rate. For example, switch control module 208 may instruct the players to switch between displaying the videos 110, 120 at a rate of about ½ to 1 Hz, although the switch control module 208 may be configurable, through user interface 204, to adjust the rate to another switching rate.

Figure 3C:
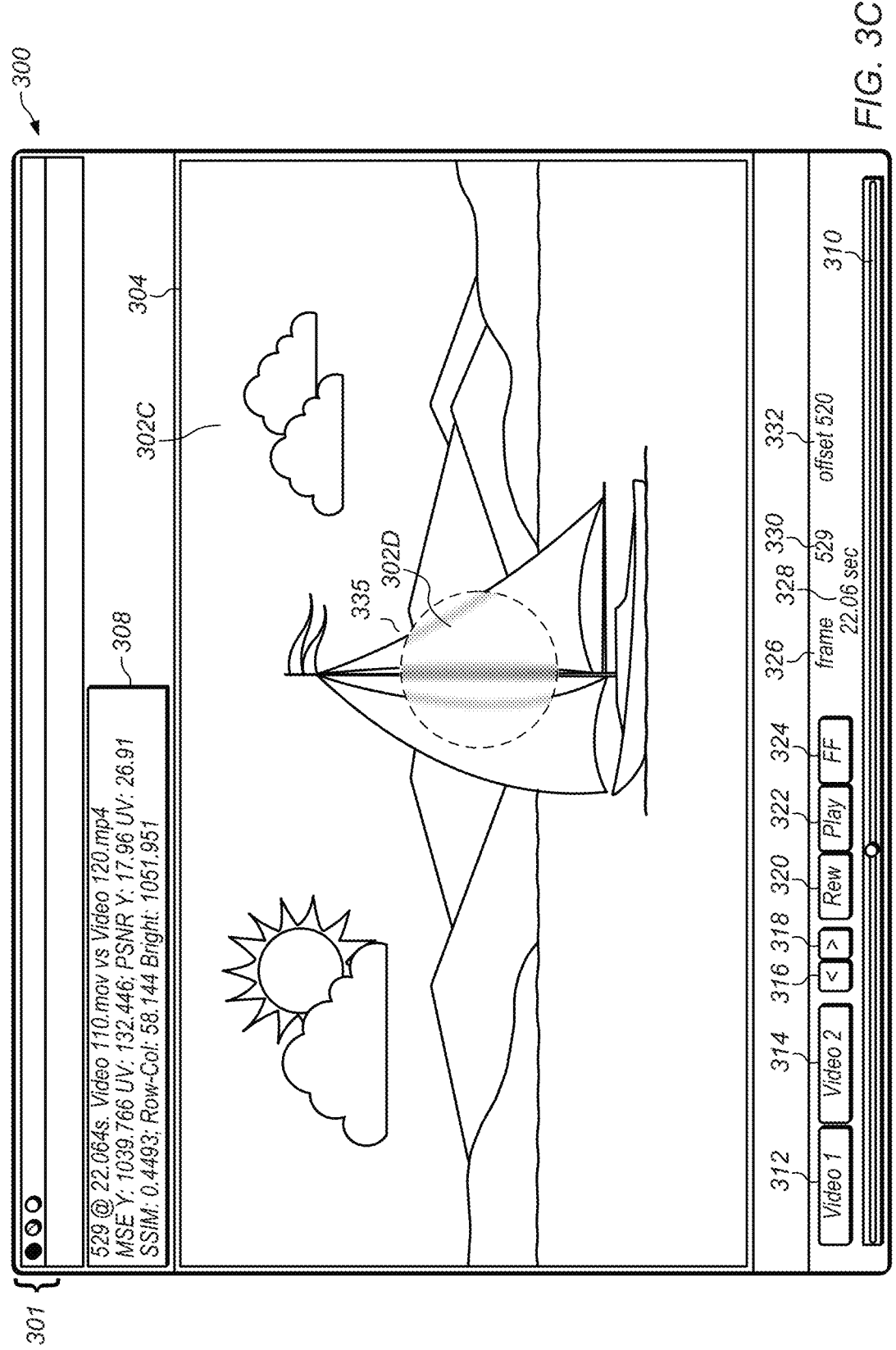
Figure 3D:
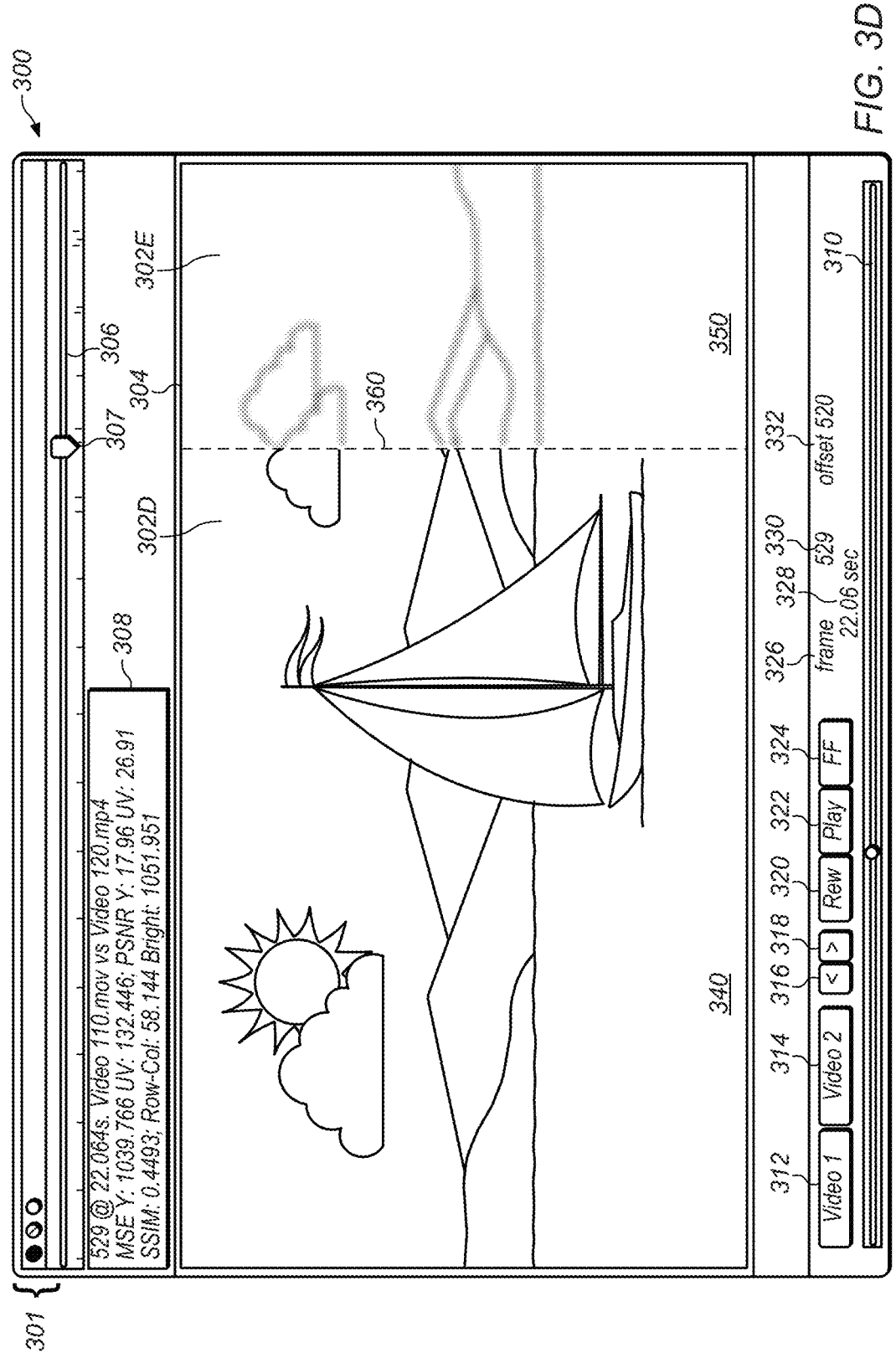

In some embodiments, display area 304 may display portions of the videos simultaneously in the same display window. User interface 204 may accept user input instructing the video tool to display portions of the videos simultaneously through video display area 304. For example, FIGS. 3C and 3D illustrate a loupe mode and split-display mode, respectively. User interface 204 may accept a menu selection from the user indicating a desired mode of operation for displaying the videos (e.g., such as a loupe mode, or split-display mode) and pass the instructions to display portion control module 210. Display portion control module 210 may accept the instructions and direct players 111, 121 to send data representing portions of videos 110, 120 to video display system 130. In some embodiments, the videos 110,120 may be displayed in display area 304, together, and with a border 360 between them. User interface 204 may accept input from a user manipulating the selectable border 360 between images 340, 350. In some embodiments, the selectable border 360 may be selected and moved by the user, thus instructing the video tool to alter the portions of the videos that are displayed. User interface 204 may send the received instructions to display portion control module 210 to control video players 111, 121 to display videos 110, 120 according to the selected portions. For example, a border 360 divides video 1 and video 2 in FIG. 3D. In some embodiments, a split display area indicator 307 may be manipulated by a user such that the user interface 204 receives input directing the border to be moved, thus changing the display ratio of videos 110, 120 in video display area 304.

In some embodiments, video tool 102 may perform an automated, quantitative analysis of the videos, or rely upon quantitative analysis performed by another application. Such analysis may reduce the amount of time spent by a user viewing the videos. For example, user interface 204 may accept instructions from a user relating to automated quantitative video fidelity analysis and pass those instructions to fidelity analysis module 212. Fidelity analysis module 212 may respond to the instructions by carrying out the desired functionality indicated by the instructions or by requesting performance of the selected functionality from another application. For example, fidelity analysis module 212 may accept instructions to evaluate encoded video by identifying spatial and/or temporal differences between the videos, 110, and 120. Spatial errors may be identified by evaluating the severity of each individual error of a frame and pooling closely located errors to determine whether the collection of errors is noticeable. Temporal errors may be identified by evaluating the quality of each frame and then pooling consecutive frames to determine whether the collection of frames has errors that may be noticeable if the errors persist within the sequence of consecutive frames. The quality of the frames may be analyzed in accordance with any conventional video fidelity analysis metric, although non-conventional metrics are also contemplated. For example, MSE (mean squared error), and PSNR (peak signal-to-noise ratio) are displayed in the information box 308 of window 300 in FIGS. 3A-3D. Other metrics may be calculated and relied upon for making determinations of video quality such as using a structural similarity index (SSIM) for better conformance/correlation with subjective tests or a metric that measures the temporal alternating brightness between the videos. In some embodiments, the metrics may be calculated upon request or in the background and cached, or stored, for example, for automatic retrieval when the videos are compared again. In some embodiments, a graphic visualization of a metric may be displayed, for example in a loupe.

In some embodiments, at least one metric is stored and sent with the video file for further analysis while in other embodiments, a metric may be sent before the video file in order to determine whether the video file should be sent at all. For example, an upload site may only accept videos if a metric associated with the video meets or exceeds a threshold value for that metric.

In various embodiments, one or more of the metrics may be used to identify segments or areas of the videos 110, 120 for further visual review by a user using the video tool 102. For example, the video tool 102 may be configured to identify segments of the videos 110, 120 where video fidelity is found to fall below a certain threshold assigned to a metric or other criterion. In some embodiments, the video tool 102 may be configured to automatically navigate to the identified segment of the video when the video is loaded into the video tool 102. Alternatively, the video tool 102 may be configured to guide the user to particular frames, or temporal regions of the video that have been found to be the most different. In one example, the user interface 204 may accept input from a user instructing the video tool to navigate to the identified segment of the video.

In various embodiments, fidelity analysis module 212 may accept and record input pertaining to the user's assessment of the quality of the video images from the user via the user interface 204 as described below in regard to FIG. 5, but not illustrated.

FIGS. 3A-3D illustrate exemplary video quality evaluation graphic user interfaces (GUIs) in accordance with some embodiments. In some embodiments, video display system 130 functions to process the output of video players 111, 121 so as to display videos 110, 120 according to instructions from video tool 102, as illustrated in FIGS. 3A-3D. For example, FIG. 3A illustrates the GUI of video tool 102 in a display window 300.

FIG. 3A illustrates the display of an image 302A of a frame of video 110 in accordance with some embodiments. FIGS. 3A and 3B, together, illustrate an alternating mode of operation of video tool 102. In this example, reference may be made to a reference video and a comparand video. In some embodiments, a comparand video is made from a reference video and the video tool 102 is used to compare the two. For example, the comparand may be a more compressed version of the reference or encoded with a different coding scheme. In another example, both the reference video and the comparand video were made from another version of the video.

Window 300 includes numerous buttons that the user may interact with through the user interface 204 to perform various functions, some standard and some particularly tailored for video comparison. For example, in the upper left hand corner of display window 300 are three menu selection buttons 301 used to access various menus. One of these menus, the File menu may include an Open Reference menu option and/or an Open Recent Reference menu option that may be used to choose a new reference video or a recently-analyzed reference, respectively. Upon selection of the Open Reference menu option, the user may be presented with an opportunity to select a first video, which, upon selection, will be opened and displayed in the video display area 304 of window 300. The File menu may also include an Open Comparand menu option, which functions in a similar manner as the Open Reference menu item but is used to select a second video for comparison to the first. In some embodiments, the comparand video is automatically accessed in response to the selection of the reference video. The File menu may also include a standard Close menu item for closing the video files.

Display window 300 may include another menu that, in some embodiments, is referred to as a Flick menu. The Flick menu may include menu items for Play, Pause, Fast Forward and Rewind that all work in the standard manner. That is, when in the alternating mode, these menu items are applied to the displayed video and when in the split-display or loupe mode, these menu items are applied to both displayed videos equally and in the same manner.

Turning now to the buttons and widgets illustrated in FIGS. 3A-D, selection of the Video 1 (alternatively, "Reference") or Video 2 (alternatively, "Comparand") buttons, 312, 314, respectively, directs switch control module 208 to instruct the respective video player to send the respective video to video display system 130 which displays the respective video in display area 304. In some embodiments, the Video 1 and Video 2 buttons, 312, 314, respectively may be highlighted to indicate which video is currently playing in display area 304. Time slider 310 may indicate where the currently displayed image falls in the timeline of the entire video. Single step reverse/forward buttons, "<" and ">" (316 and 318) single step, in reverse or forward, through video frames one at a time. Once again, as described above in regard to the menu items, in some embodiments, the functionality described for each button or widget may be applied selectively to either of the videos 110, 120 being compared, or to both simultaneously.

User interface 204 may also respond to gestures and selection of keyboard keys. In some embodiments, movement of the cursor within the display area, or selection of particular keys instructs the video tool 102 to switch between displaying the videos 110, 120. For example, one video may be selected when the cursor is on the left side of the frame while the other video may be selected when the cursor is on the right side of the frame. In another example, selection of the Up-Arrow key selects one video while selection of the Down-Arrow key selects the other video. Various keys may also be linked to any of the functionally associated with the menu items or buttons and widgets discussed above. For example, selection of the Right-Arrow key may cause forward stepping functionality while selection of the Left-Arrow key may cause reverse stepping functionality.

The Flick menu may also include Slow Forward and Slow Reverse menu items. Selection of these menu items results in the respective players 111, 121 playing their respective videos at a slower rate than normal (e.g., ½ or ⅓ the normal frame rate of the videos) either forward or reverse, depending on the selection. For example, selection of the Slow Forward menu item may result in the respective player playing the respective video at 1 frame per second, although other rates are contemplated, for example, 2 or 3 frames per second. The Flick menu may also include Step Forward and Step Reverse menu items. Selection of these menu items results in the respective player moving to the next or previous frame, of the respective videos 110, 120. In some embodiments, if the Step Forward or the Step Reverse menu items are selected while one or both of the videos 110, 120 are playing, the videos pause. If the frame rates of the two videos are unequal, the step functionality will attempt to complete the task as nearly as possible by using the corresponding frame times. Some embodiments may use interpolation to create a frame that matches in time with the frame it is being compared to. Other Flick menu items may include See Reference Video and See Comparand Video which, when selected, may cause switch control module 208 to direct players 111, 121 to deliver respective videos 110, 120 to video display system 130 that drives display area 304. In some embodiments, when no comparand video has been selected and the See Comparand Video menu item is selected, a black screen is displayed in display area 304.

FIG. 3A illustrates a scenario where video tool 102 is being used to compare the first video 110 with the second video 120. In FIG. 3A, display window 300 of video tool 102 includes an image 302A of a video frame from video 110 in display area 304. Information box 308 includes data pertaining to videos 110, 120. Some of the data may be calculated by fidelity analysis module 212 such as MSE (mean squared error), and PSNR (peak signal-to-noise ratio), for example. Within information box 308, "529 @ 22.064" is the frame number, "529" at time "22.064" seconds. Video 110.mov is the file name of the first video 110 and Video 120.mp4 is the file name of the second video 120. "MSE Y: 1039.766 UV: 132.446" is the mean square error metric from analysis of the videos, and "PSNR Y: 17.96 UV: 26.91" describes the peak signal-to-noise ratio. "SSIM:

0.4493" describes structural similarity between the frames as 0.4493. "Row-Col: 58.144" is a row-column metric for indicating video quality that may be calculated based on a squared difference, absolute value or other two-parameter function rather than the absolute value as a measure for each row, column, or patch. "Bright: 1051.951" is an indicator of the brightness difference between the frames. Video tool 102 may be configured to display other information to the display area 304, in other areas of the display window 300, or in the visual display outside display window 300, either graphically or textually, for example.

In FIG. 3A, selection of the reverse step button 316 or the forward step button 318 instructs the video tool 102 to instruct the respective video player (in this case video player 111) to step back one frame or step forward one frame. Rewind button 320, play button 322 and fast-forward button 324 provide access to the functionality that corresponds with their names. Current frame indicator 326 shows the frame number (330, here "529") currently displayed in the window 300 and time indicator (328, here, "22.06 seconds") shows the current play time. The offset control 332 displays the number (here, "520") of frames that the second video (in this case video 120) is delayed from start of the first video 110. In FIG. 3A, progress bar 310 indicates the progress of the displayed video with reference to the entire length of the displayed video. In some embodiments, progress bar 310 may be depicted as a graph of a video fidelity metric.

FIG. 3B illustrates a mode where video tool 102 is being used to compare the first video 110 with the second video 120. FIG. 3B depicts display of video 120 in the same window 300 as depicted in FIG. 3A. In FIG. 3B, display window 300 of video tool 102 includes an image 302B of a frame of video 120 in display area 304. In FIG. 3B, video tool 102 has instructed player 111 to stop sending video 110 and player 121 to start sending video 120 to video display system 130. FIG. 3B depicts the image of the boat as blurry when compared to the depiction of the boat in FIG. 3A. The blurriness may be due to the different coding scheme applied to video 120. When the video controller 102 switches the images in window 300 back and forth between video 110 and video 120, the blurriness will appear to flicker or blink while the rest of the image does not. In some embodiments, such flickering or blinking facilitates determination of differences between videos, which may be used to determine the quality of the video. In some embodiments, a user may recognize such flickering and record it in video tool 102, for example, assigning a value to a video quality metric.

FIG. 3C illustrates a loupe view mode of video tool 102. As described above, a user may select the loupe view mode through the user interface 204. In FIG. 3C, a portion of image 302C in display area 304 of video 110 surrounds a circular "loupe" 335 that displays a portion of image 302D of video 120. In some embodiments, the loupe is selectable and movable across the display and may have a configurable shape. The boundary formed by the loupe between the portion of image 302C and the portion of image 302D may be a seamless boundary. For example, FIG. 3C illustrates the boundary formed by the loupe as a dashed circular line 335. In some embodiments, the dashed line would be omitted and the only indication of the loupe would be the difference between the videos 110, 120 in the area of the loupe. In some embodiments, the dashed circular line indicating the loupe may be configurable (e.g., a dotted line, or no line at all, or the diameter of the loupe may be configurable) while in other embodiments, some other graphical indication of the loupe may be displayed. For example, a slight change in chroma or luma within the area of the loupe. It is contemplated that the user interface 204 and display portion control module 210 may be coordinately configured to support multiple loupes. For example, the multiple loupes may display multiple portions of image 302D in display area 304. In some embodiments, a loupe may be used whether or not the video tool is in loupe view mode, albeit in a different manner and for a different reason. For example, a loupe may be used as a magnifier in split-display mode to examine small areas closely. In this example, instead of displaying the other video in the loupe, the loupe acts to magnify what is already in display area 304.

In some embodiments, a mode may be selected where the Play, Pause, Fast Forward and Rewind buttons may be applied selectively to the videos being compared in loupe mode. For example, in an alternative embodiment, images 302C and 302D may both be paused and then the user may use the step buttons 316, 318 to step forward or in reverse "around" image 302D, e.g., image 302C may be directed to change while image 302D remains paused.

FIG. 3D illustrates a split display window. In FIG. 3D, display portion 340 displays a portion of video 110 while display portion 350 displays a portion of video 120. FIG. 3D illustrates a boundary line 360 between portions 340, 350 of videos 110, 120 in display area 304. In various embodiments, the boundary line 360 is not visible. FIG. 3D includes pointer bar 306 for graphically determining the position of the boundary line 360 between image 302E of video 1 and image 302(F) of video 2. The split display area indicator 307 of pointer bar 306 may be selected by the user and dragged along the pointer bar 306 to instruct display portion control module 210 how to apportion videos 110, 120 between display portions 340 and 350. In some embodiments, boundary line 360 itself may be selectable and movable. For example, the invisible boundary line may become visible when the cursor passes over it. In some embodiments, the boundary line may always be visible. In some embodiments, the dashed line 360 would be omitted and the only indication of the boundary would be the difference between the videos 110, 120 in the area of the boundary. In some embodiments, the dashed line indicating the boundary may be configurable (e.g., a dotted line, a semi-transparent line or no line at all) while in other embodiments, some other graphical indication of the boundary may be displayed. It is contemplated that the user interface 204 of video tool controller 102 may be configured such that other user inputs may move or configure the boundary line 360. For example, selection of particular keys from the keyboard or gestures may move the boundary line 360 across display area 304.

Although many of the above-described embodiments, examples, and illustrations compare two videos, it is contemplated that three or more videos could be compared using the apparatus and methods described within without departing from the scope of the invention. For example, in the alternating mode, additional video selection buttons (312, 314 . . . n) may be included with the user interface such that the user could selectively alternate in between any of a number of videos. Additionally, the user interface 204 and switch control module may be coordinately configured to select a mode of operation that automatically switches among any number of videos at some periodic rate. In another example, the user interface and display portion control module may be coordinately configured to support a side-by-side-by-side mode of operation where 3 or more videos are displayed in display area 302 with multiple borders 360. In yet another example, the user interface and display portion control module may be coordinately configured to support a multi-loupe mode of operation where 2 or more loupes (335a, 335b ... 335n), each associated with a different respective video, are displayed in display area 302 along with the image 302C from a third video.

Figure 4:
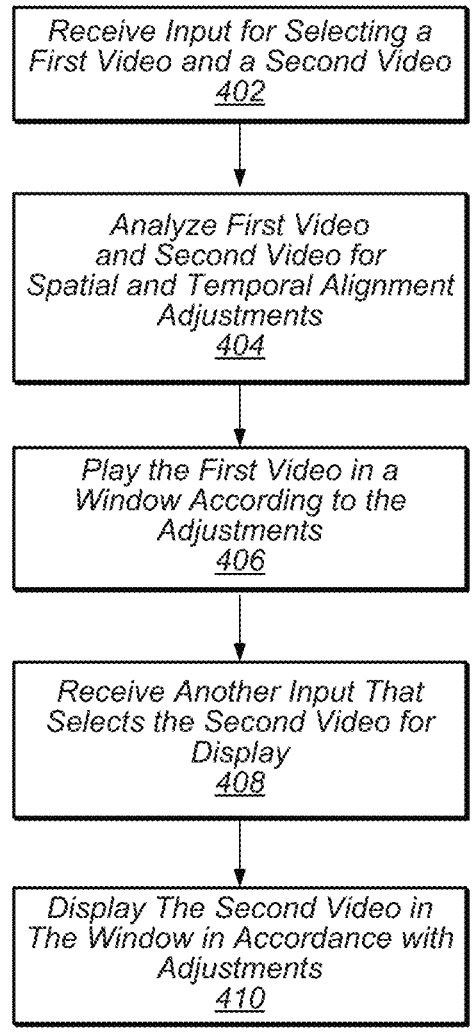
FIG. 4 illustrates a functional flow block diagram of a method for video quality evaluation in accordance with some embodiments.

FIG. 4 illustrates a functional flow block diagram of a method for displaying videos for video quality comparison in accordance with some embodiments. As described above, the various embodiments of the video tool controller may provide the functionality attributed to the user interface 204 and modules 206-212 of FIG. 2. In some embodiments, the functionality described in FIG. 4 is carried out by components of video tool controller 102 while in some embodiments, the functionality is carried out by a combination of video tool controller 102 and players 111, 121.

In FIG. 4, a first video and a second video are selected based upon input received from the user (block 402). For example, user interface 204 may receive instructions from a user selecting a first video 110 and a second video 120 for comparative display. The user interface will then instruct players 111, 121 to access the files and prepare to play them. Preparation may include analyzing the videos 110, 120 for spatial and temporal alignment adjustments (block 404). For example, content analysis module 206 may analyze videos 110, 120 to determine adjustments that may be made to the display of the videos 110, 120 such that the videos, when superimposed, play in pixel registration.

The first video may be displayed in a window 300, according to the adjustments (block 406). For example, video tool controller 102 may be configured to automatically instruct player 111 to begin sending video 110 to video display system 130 as soon as the adjustments have been determined by content analysis module 206. In another example, video tool 102 may receive instruction from the user via user interface 204 to begin display of video 110. In response to the instructions from the user, video player 111 may be instructed to send video 110 to video display system 130 that drives video display area 304.

Another input may be received from the user that selects the second video for display (block 408). For example, video tool 102 may receive instruction from the user through user interface 204 to stop display of video 110 and begin display of video 120 (for example, by selection of the Video 2 button 314). The user interface 204 may pass the instruction to switch control module 208 that may instruct video player 111 to stop sending video 110 and instruct video player 112 to start sending video 120 to video display system 130. The second video may then be displayed in the window in accordance with the adjustments (block 410).

Figure 5:
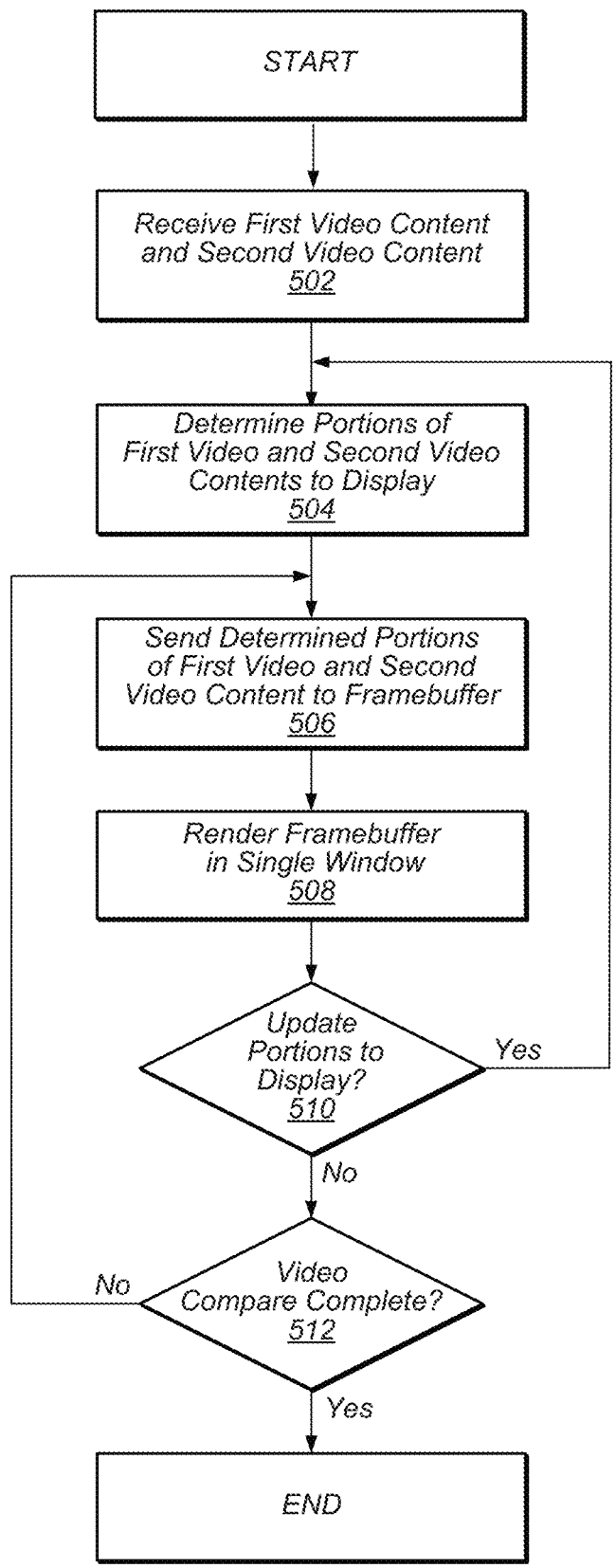
FIG. 5 illustrates another functional flow block diagram of a method for video quality evaluation in accordance with some embodiments.

FIG. 5 illustrates a functional flow block diagram of a method for video quality comparison in accordance with some embodiments. FIG. 5 illustrates a method for displaying and evaluating video quality when portions of two videos are being compared within the same window at the same time (e.g., as illustrated in FIGS. 3C, 3D).

The functionality described in FIG. 5 does not include all the details of the user interface and video selection process that are described in detail in FIG. 4. However, in various embodiments, aspects of the user interface and video selection process described in FIG. 4 may be combined with functionality described in FIG. 5 without departing from the scope of the invention.

In FIG. 5, a first video content and a second video content are received (block 502). For example, players 111, 121 receive videos 110, 120 (e.g., into buffers associated with the respective players). Portions of the first and second video content are determined for display (block 504). For example, display portion control module may determine that the user has selected a particular mode of display, for example, the split display mode or loupe mode illustrated in FIGS. 3C, 3D. In response to the user input, the display portion control module 210 may calculate new portions and instruct players 111, 121 to alter the portions of videos 110, 120 that are being sent to video display system 130.

Various embodiments have been disclosed that describe multiple ways to determine the portions of the videos to display. For example, display portion control module 210 may determine the portions to display from a configuration file that includes settings determining the portions. In another example, display portion control module 210 may determine the portions to display from user input such as the positioning or resizing of loupe 335 in the display window 300 as illustrated in FIG. 3C or the positioning of split display area indicator 307 in FIG. 3D.

In various embodiments, the determined portions of the first and second content may be sent to a framebuffer (block 506). For example, players 111, 121 may send the determined portions of videos 110, 120 to a framebuffer in video display system 130 that drives video display area 304. The contents of the framebuffer may be rendered in a single window (block 508). For example, the contents of a framebuffer in video display system 130 that includes data from the portions of videos 110, 120 may be rendered to display area 304 in window 300 as illustrated in FIG. 3D.

The portions to display may be updated (block 510). Updating the display may be performed in accordance with many of the embodiments described above and illustrated in FIGS. 3A-3D, such as selecting the alternating mode, or the split display mode, or the loupe mode. In some embodiments, instructions are received from the user through user interface 204 to alter/configure the size of the loupe or to change/configure the position of the loupe or the line boundary as described herein.

In response to selection of the alternating mode of view illustrated in FIGS. 3A-B, entire frames of videos 110, 120 are sent to video display system 130 instead of portions. In the split display mode, user interface 204 and display portion control module 210 may coordinate to turn changes in configuration or other user inputs (e.g., dragging the border 360) into changes/updates of the portions of each video displayed. Similarly, in loupe mode, user interface 204 and display portion control module 210 may coordinate to turn changes in configuration or other user inputs (e.g., dragging the loupe) into changes/updates of the areas or portions of each video that are displayed.

For example, as described in various embodiments above, the user interface 204 and display area 304 may be configured to accept various user inputs (e.g., display mode selection or configuration changes). For example, as illustrated in FIGS. 1, 2 and 3A, display portion control module 210 may respond to user input (e.g., selection of the loupe tool mode) by instructing one of the players 111, 121 to send a portion of image 302D from one of the videos 110, 120 to video display system 130 for display within the loupe 335 of display window 300. The portion sent may correspond to the configuration of the loupe. For example, if the loupe is resized, the portion of the image sent to video display system 130 will also change in a corresponding size, or if the loupe is moved, the portion of the video sent will come from an area of the image corresponding to the new area covered by the loupe.

Similarly, in split-display mode, display portion control module 210 may respond to user input (e.g., movement of the border 360) by directing the players 111, 121 to send their respective portions of image 302E and 302(F) from the respective videos 110, 120 to video display system 130 for display in display window 300. For example, the portion sent, or the portion directed to be sent, may correspond to the portion of display area allocated to each respective image 302E, 302(F), as defined by border 360. For example, if the border 360 is moved, the portion of each of the images sent from players 111, 121 to video display system 130 will change in a corresponding fashion.

If the portion to display has been updated (block 510, yes) the method may return to the determining the portions of the first and second video to display step (block 504). If the portions to display have not been updated (block 510, no) the process may move to the next step, determining whether the video comparison is complete (block 512).

If the video comparison is not complete at this point (block 512, no), the process may return to (or continue to) send the determined portions of the videos to the framebuffer (block 506). Otherwise, if the video comparison is complete (block 512, yes), the process ends or the next content for analysis may be selected. For example, the user may instruct the video tool 102, through the user interface 204, to load and display another set of videos. In another example, video tool 102 automatically finds and begins to display the next set of videos for evaluation.

As disclosed above, fidelity analysis module 212 includes functionality to support quantitative analysis of comparative video image quality. In some embodiments, metrics from the quantitative analysis may be displayed in the display window. For example, information box 308 of window 300 displays metrics determined by fidelity analysis module 212 that are associated with the videos 110, 120. In some embodiments, the metrics developed by the quantitative analysis module 212 may be used to direct (guided navigation) the user to particular segments of the videos 110, 120 for visual comparison with video tool 102. In one example, video tool 102 automatically moves (automated navigation) to and displays the segments of videos 110, 120 that the quantitative analysis has identified as of poor image quality. In some embodiments, the user may interact with the user interface 204 to record (e.g., written description or audio recording of the user's assessment, or a checkbox interface) comparison results of the user's assessment of the content fidelity after viewing areas of the videos. In some embodiments, the record is saved and/or combined with the quantitative analysis into a report.

Example Computer System

Figure 6:
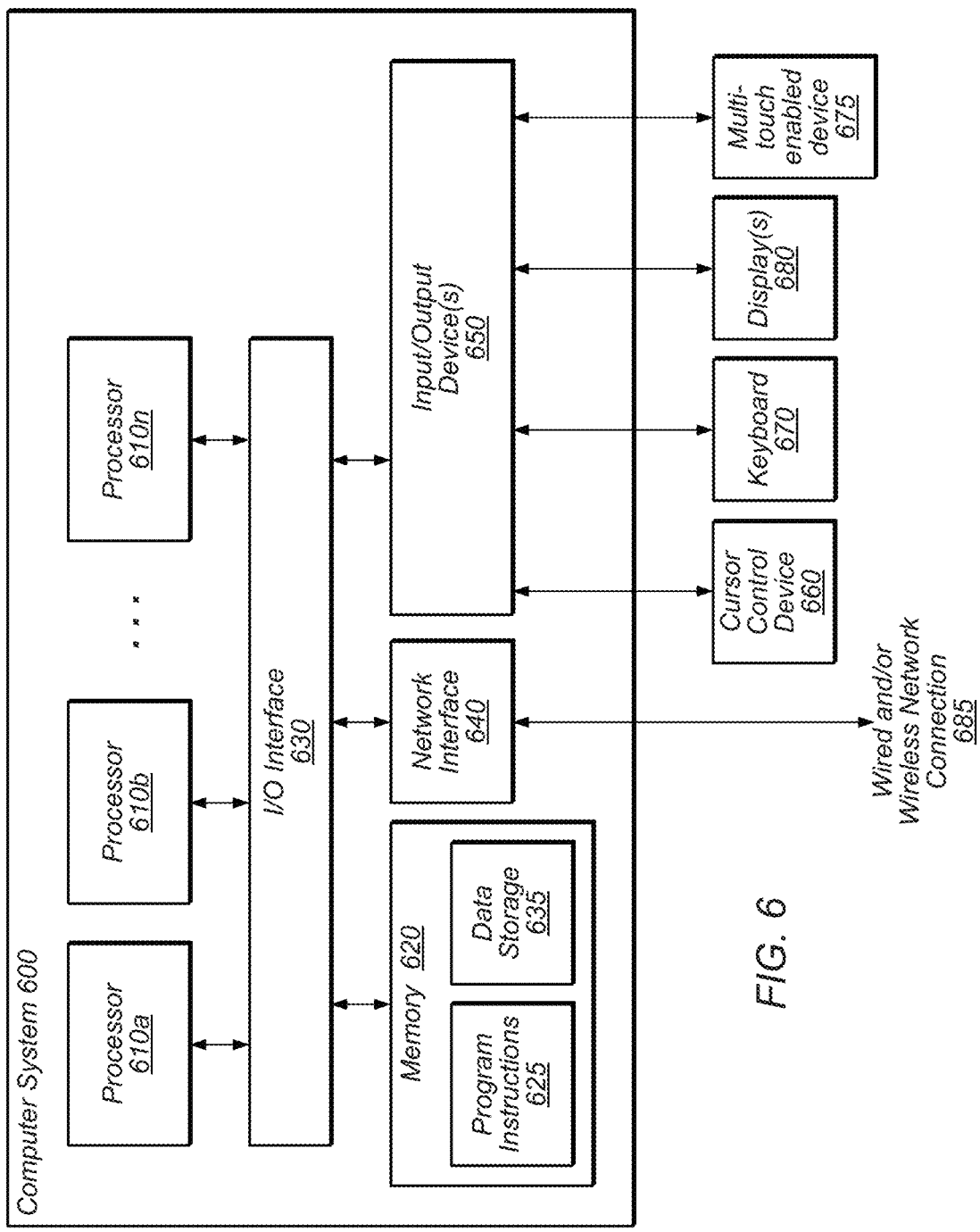
FIG. 6 illustrates a system diagram of a computer system in accordance with some embodiments.

FIG. 6 illustrates computer system 600 that is configured to execute any or all of the embodiments described above. In different embodiments, computer system 600 may be any of various types of devices, including, but not limited to, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a system and method for comparing and evaluating video sequences through direct perceptual comparison, as described herein, may be executed on one or more computer systems 600, which may interact with various other devices. Note that any component, action, or functionality described above with respect to FIGS. 1-5 may be implemented on one or more computers configured as computer system 600 of FIG. 6, according to various embodiments. In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, display(s) 680, and multi-touch enabled devices 675. In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store program instructions 625 and/or data 635 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions 625 may be configured to implement a video tool application 102 incorporating any of the functionality described above. In some embodiments, program instructions and/or data may be received, sent or stored upon different types of computer-accessible media or on similar media separate from system memory 620 or computer system 600. While computer system 600 is described as implementing the functionality of functional blocks of previous Figures, any of the functionality described herein may be implemented via such a computer system.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments, some or all of the functionality of I/O interface 630, such as an interface to system memory 620, may be incorporated directly into processor 610.

Network interface 640 may be configured to allow data to be exchanged between computer system 600 and other devices attached to a network 685 (e.g., carrier or agent devices) or between nodes of computer system 600. Network 685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

As shown in FIG. 6, memory 620 may include program instructions 625, which may be processor-executable to implement any element or action described above. In one embodiment, the program instructions may implement the methods described above, such as the methods illustrated by FIGS. 4 and 5. In other embodiments, different elements and data may be included. Note that data 635 may include any data or information described above.

Those skilled in the art will appreciate that computer system 600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may, in some embodiments, be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A method, comprising:

performing, by one or more computing devices:

receiving user input for selecting a first video and a second video, the first and second videos to be played in a single window, wherein the first and second videos are different versions of a same video source content;

aligning the first and second videos to play superimposed in both space and time in a display area of said single window; and displaying both the first video and the second video at the same time in the single window wherein the first video and the second video are displayed in time alignment with one another, wherein said displaying both the first video and the second video at the same time comprises:

determining, based at least in part on user input obtained during display of one or more of the videos, portions of each of the first video and the second video to display in the display area of said single window;

providing synchronous display of the two versions of the video for direct visual comparison of the two versions of the video, wherein providing synchronous display includes:

displaying the determined portion of the first video in a first area of the display area, and displaying the determined portion of the second video in a second area within the first area of the display area at the same time such that the determined portion of the first video displayed in the first area surrounds the determined portion of the second video displayed in the second area, such that the respective determined portions of the first and second videos are in pixel alignment along a boundary between the respective determined portions, and such that the determined portion of the second video is displayed superimposed in both space and time alignment with the first video;

wherein the same video source content is displayed throughout the display area irrespective of the location of the determined portion of the second area within the first area of the display area.

2. The method of claim 1, wherein a boundary between the first area and the second area is defined by a shape.

3. The method of claim 2, wherein the shape is configurable.

4. The method of claim 2, wherein the shape is a circle.

5. The method of claim 1, wherein a boundary between the first area and the second area is a seamless boundary.

6. The method of claim 1, wherein the second area is movable in an x dimension and a y dimension of the single window.

7. The method of claim 1, further comprising:
analyzing the first and second videos to determine if the first and second videos are different sizes; and
in response to determining that the first and the second videos are different sizes, determining one or more adjustments to make the first and the second videos play in spatial alignment.

8. The method of claim 1, further comprising displaying video fidelity metrics.

9. The method of claim 1, further comprising providing automated or guided navigation to a segment of the videos, wherein the segment of the videos have been identified through analysis of a video fidelity metric.

10. A system, comprising:
at least one processor; and
a memory comprising program instructions that when executed by said at least one processor implement a video tool, the video tool configured to:
receive user input for selection of a first video and a second video, the first and second videos to be played in a single window, wherein the first and second videos are different versions of a same video source content;
align the first and second videos to play superimposed in both space and time in a display area of said single window; and
instruct display of both the first video and the second video at the same time in the single window wherein the first video and the second video are displayed in time alignment with one another, instruct display both the first video and the second video at the same time comprising:
determine, based at least in part on user input obtained during display of one or more of the videos, portions of each of the first video and the second video to display in the display area of said single window;

provide synchronous display of the two versions of the video for direct visual comparison of the two versions of the video, wherein to provide synchronous display the video tool is further configured to:
instruct display of the determined portion of the first video in a first area of the display area, and
instruct display of the determined portion of the second video in a second area within the first area of the display area at the same time such that the determined portion of the first video displayed in the first area surrounds the determined portion of the second video displayed in the second area, such that the respective determined portions of the first and second videos are in pixel alignment along a boundary between the respective determined portions, and such that the determined portion of the second video is displayed superimposed in both space and time alignment with the first video;
wherein the same video source content is displayed throughout the display area irrespective of the location of the determined portion of the second area within the first area of the display area.

11. The system of claim 10, wherein a perimeter of the second area is defined by a configurable shape.

12. The system of claim 10, wherein a boundary between the first area and the second area is a seamless boundary.

13. The system of claim 10, wherein the second area is movable in an x dimension and a y dimension of the single window.

14. The system of claim 10, wherein the video tool is further configured to:
analyze the first and the second videos to determine if the first and second videos are different sizes; and
in response to a determination that the first and the second videos are different sizes, determine one or more adjustments to make the first and the second videos play in spatial alignment.

15. A non-transitory computer-readable storage medium storing program instructions that when executed by a computing device implement a video tool configured to:
receive user input for selection of a first video and a second video, the first and second videos to be played in a single window, wherein the first and second videos are different versions of a same video source content;
align the first and second videos to play superimposed in both space and time in a display area of said single window; and
instruct display of both the first video and the second video at the same time in the single window such that the first video and the second video are displayed in time alignment with one another, wherein said instruct display of both the first video and the second video at the same time comprises:
determine, based at least in part on user input obtained during display of one or more of the videos, portions of each of the first video and the second video to display in the display area of said single window; and
provide synchronous display of the two versions of the video for direct visual comparison of the two versions of the video, wherein to provide synchronous display the video tool is further configured to:
instruct display of the determined portion of the first video in a first area of the display area, and instruct display of the determined portion of the second video in a second area within the first area of the display area at the same time such that the determined portion of the first video displayed in the first area surrounds the determined portion of the second video displayed in the second area, such that the respective determined portions of the first and second videos are in pixel alignment along a boundary between the respective determined portions, and such that the determined portion of the second video is displayed superimposed in both space and time alignment with the first video;

wherein the same video source content is displayed throughout the display area irrespective of the location of the determined portion of the second area within the first area of the display area.

16. The non-transitory computer-readable storage medium of claim 15, wherein a perimeter of the second area is defined by a configurable shape.

17. The non-transitory computer-readable storage medium of claim 15, wherein the second area defines a loupe.

18. The non-transitory computer-readable storage medium of claim 15, wherein a boundary between the first area and the second area is a seamless boundary.

19. The non-transitory computer-readable storage medium of claim 15, wherein the second area is movable in an x dimension and a y dimension of the single window.

20. The non-transitory computer-readable storage medium of claim 15, wherein the video tool is further configured to:
   analyze the first and the second videos to determine if the first and the second videos are different sizes; and
   in response to a determination that the first and the second videos are different sizes, determine one or more adjustments to make the first and the second videos play in spatial alignment.

* * * * *